United States Patent
Molko et al.

(10) Patent No.: US 9,031,157 B2
(45) Date of Patent: May 12, 2015

(54) PAPR REDUCTION USING CLIPPING FUNCTION DEPENDING ON THE PEAK VALUE AND THE PEAK WIDTH

(76) Inventors: Christophe Molko, Villepreux (FR); Matti Limingoja, Kerava (FI)

( * ) Notice: Subject to any disclaimer, the term of this patent is extended or adjusted under 35 U.S.C. 154(b) by 64 days.

(21) Appl. No.: 13/820,940

(22) PCT Filed: Aug. 12, 2011

(86) PCT No.: PCT/EP2011/063979
§ 371 (c)(1),
(2), (4) Date: May 15, 2013

(87) PCT Pub. No.: WO2012/031855
PCT Pub. Date: Mar. 15, 2012

(65) Prior Publication Data
US 2013/0230121 A1    Sep. 5, 2013

(30) Foreign Application Priority Data
Sep. 10, 2010  (EP) .................... 10176205

(51) Int. Cl.
  H04K 1/02    (2006.01)
  H04L 27/26   (2006.01)
(52) U.S. Cl.
  CPC .................. H04L 27/2623 (2013.01)
(58) Field of Classification Search
  USPC .................. 375/295, 296, 284–285, 350
  See application file for complete search history.

(56) References Cited

U.S. PATENT DOCUMENTS

| | | | |
|---|---|---|---|
| 5,899,864 A | * | 5/1999 | Arenson et al. ............. 600/455 |
| 2004/0179468 A1 | * | 9/2004 | Jaenecke et al. ............. 370/203 |
| 2007/0206703 A1 | * | 9/2007 | Corredoura ................. 375/296 |
| 2009/0034407 A1 | * | 2/2009 | Lindh ........................ 370/210 |
| 2010/0020895 A1 | * | 1/2010 | Jiang et al. ................. 375/295 |

FOREIGN PATENT DOCUMENTS

EP    1 811 732 A2    7/2007
EP    1 835 678 A1    9/2007

OTHER PUBLICATIONS

International Search Report mailed Sep. 2, 2011, in connection with International Application No. PCT/EP2011/063979, filed Aug. 12, 2011.

* cited by examiner

*Primary Examiner* — Emmanuel Bayard
(74) *Attorney, Agent, or Firm* — Duane Morris LLP; J. Rodman Steele, Jr.; Gregory M. Lefkowitz (57) ABSTRACT

For clipping a signal with respect to a clipping threshold ($A_{max}$), a signal portion above the clipping threshold and a peak (Pk) in the signal portion are detected, a clipping function depending on end times ($t_s$, $t_e$) of the signal portion, the amplitude of the detected peak and the clipping threshold is derived, and the signal portion is clipped by multiplying it by the clipping function. The first portion can be enlarged up to the lowest boundary points ($t_1+1$, $t_2-1$) on the first ascending portion and the last descending portion of the detected peak. Spectral leakage in the sidebands out to the frequency band of the clipped signal is eliminated by a filtering device. The filtered dipped signal to the input of the amplifier has peaks as close to the saturation threshold of a power amplifier as possible.

12 Claims, 4 Drawing Sheets

PAPR REDUCTION USING CLIPPING FUNCTION DEPENDING ON THE PEAK VALUE AND THE PEAK WIDTH

CROSS-REFERENCE TO RELATED APPLICATIONS

This application is a §371 national stage entry of International Application No. PCT/EP2011/063979, filed Aug. 12, 2011, which claims priority to EP Application No. 10176205.2, filed Sep. 10, 2010, the entire contents of which are incorporated herein by reference.

The present invention relates to a method and a device for clipping a signal, so as to reduce the peak-to-average power ratio PAPR of the signal before being amplified. The peak-to-average power ratio of the signal is defined by the ratio of the highest power of the signal on the average power of the signal.

For example, the signal can be a single carrier signal, or a wideband multi-carrier signal OCDM (Orthogonal Code Division Multiplexing) or OFDM (Orthogonal Frequency Division Multiplexing), to be emitted from a radio communication transmitter.

In the output stage of an emitter, it is known to make use of a power amplifier to amplify a baseband incoming signal to be emitted. The power amplifier is a nonlinear device that significantly introduces distortion in the signal outputting from the amplifier. The output power being function of the input power characterizing the nonlinear behaviour of the amplifier has a linear region followed above a saturation threshold by a nonlinear region which becomes incurved and then flattens. If power peaks of the incoming signal are included in the nonlinear region, these power peaks are compressed, generate harmonics which are emitted outside the frequency band of the incoming signal, and cause lowering of the power efficiency of the amplifier. Furthermore when the incoming signal results from multiplexing carriers, as an OFDM signal sensitive to a nonlinear distortion, and has a power level too high, cross modulations occur between the carriers and cause distortion in the output signal. In a receiver processing the emitted amplified signal, the power peaks of the incoming signal included in the nonlinear region cause an error rate.

It is thus required to avoid the saturation of the power amplifier.

Before amplifying the incoming signal and reducing the nonlinear effect of the amplification on the outgoing signal, power peaks of the incoming signal above a preset threshold substantially corresponding to the saturation threshold of the power amplifier must be clipped without losing too much information. The clipped signal can be filtered in dependence on the bandwidth of the incoming signal to eliminate noise sidebands of the clipped signal outside the frequency band of the incoming signal.

U.S. Pat. No. 7,386,060 B2 discloses a method of reducing the ratio PAPR of a signal to be transmitted in the time domain from a transmitter. The method comprises detecting a portion of the signal, such as a peak, above a clipping threshold level, decomposing the signal portion into symmetric elementary functions, such as gaussian or triangle functions, whose number is proportional to the duration of the signal portion, and performing soft-clippings of the signal portion being above the clipping threshold level by using a scaled reference function which is subtracted from each of the elementary functions such that the subtracted elementary functions reduce a peak power of the signal portion being above the clipping threshold level and multiple soft-clipping iterations are avoided. Particularly, the elementary functions avoid generating double peaks and have a limited bandwidth so that soft-clipping does not cause spectral leakage in the signal to be transmitted and can be directly applied to a power amplifier.

U.S. Pat. No. 7,336,724 B2 concerns a method for scaling peak power amplitudes in an incoming wideband multi-carrier signal before submitting the incoming signal in a power amplifier of a transmitter to reduce the ratio PAPR of the incoming signal. More particularly, this method is directed to the reduction of "overclipping" effects on a peak by taking into account the interactive influence of adjacent peaks. The "overclipping" effects occur when the distance between this peak and other adjacent peaks of the incoming signal exceeding a threshold is small enough to cause overlapping of the clipping functions for the peaks and interference between the clipping of different peaks. The clipping method comprises calculating scaling factors for a pulse train of the incoming signal comprising a group of at least two peaks whose power exceeds a predefined threshold, the scaling factor for one peak taking into account an influence on the peak which occurs if at least one other peak of the group is applied a scaling factor; and applying the calculated scaling factors to the respective peaks of the group. The influence depends on the distance between the peak and said at least one other peak that has to be smaller than a predefined distance, i.e. said at least one other peak has to be located in a "convolutional" range of the peak where the clipping function of said peak influences said at least one other peak. The scaling factor to be applied to said peak is thus calculated by taking into account the influence of the other peaks located in the convolutional range of said peak. The calculation of the scaling factor for each peak exceeding the predefined threshold is complex. Furthermore, the output signal consisting in subtracting coefficients of weighted clipping functions of the peaks from the incoming signal still includes overclipping of some peaks.

The main object of this invention is to clip a signal with an optimized power to be applied to a band-pass filter and a power amplifier without having recourse to a complex and costly calculation of clipping functions for each signal peak to be clipped so that spectral leakage in the sidebands out to the frequency band of the clipped signal is eliminated by the band-pass filter and the filtered clipped signal to the input of the amplifier has peaks as close to the saturation threshold of the power amplifier as possible to improve the power efficiency.

To achieve this object, a method for clipping a signal with respect to a predetermined clipping threshold, including detecting the ends of a signal portion above the clipping threshold and a peak in the signal portion, is characterized in that it includes:

deriving a clipping function having values less than 1 and depending on the times on the ends of the signal portion, the amplitude of the detected peak and the clipping threshold, and clipping the signal portion by multiplying it by the clipping function into a clipped portion.

The times on the ends of the signal portion define a time window where the detected peak and neighbouring signal samples of the detected peak of the signal are clipped by means of the clipping function so that the detected peak having the maximum amplitude in the time window is at the clipping threshold. These conditions introduce in the sidebands out to the frequency band of the clipped signal not many spectral leakages that are eliminated by a band-pass filtering device connected to a clipping device according to the invention. However the low growth of the clipped peak filtered in the filtering device and to be amplified in a power amplifier connected to the filtering device is less than the growth of a clipped peak filtered according to the prior art, when the amplitude of the filtered clipped peak is at most equal to the saturation level of the power amplifier. The ratio PAPR of the filtered clipped signal provided by the method of the invention is lower than the ratio PAPR according to the prior art. The clipping method according to the invention enables to reduce constraints on the power amplifier and is less complex than the known clipping methods above commented.

According to a particular embodiment of the invention, the clipping method includes enlarging the signal portion to be clipped up to at least one of first and second boundary points of the signal. The first boundary point precedes the signal portion and is located below the clipping threshold and on a first ascending portion to the detected peak. The second boundary point follows the signal portion and is located below the clipping threshold and on a last descending portion from the detected peak. The clipping function is further derived as a function of the time of said at least one of the first and second boundary points, i.e. as a function of the time of the first boundary point and/or the time of the second boundary point. This embodiment allows decreasing significantly the transient power in sidebands of the clipped signal and thus the constraints in the filtering device.

In a first aspect of the particular embodiment, the time intervals between the first boundary point and the detected peak and between the detected peak and the second boundary point can be predetermined and depend on pre-stored integer numbers of signal samples. The one of these integer numbers can be equal to zero.

In a second aspect of the particular embodiment, the clipping method further includes detecting at least one of the lowest boundary point, as said first boundary point, located on the first ascending portion to the detected peak and the lowest earlier boundary point, as said second boundary point, located on the last descending portion from the detected peak. Enlarging each of the signal portions to be clipped up to the lowest boundary points on the ascending and descending portions of the detected peaks above the clipping threshold smoothes the transitions in the form of "gorges" between the succeeding peaks in the clipped signal and restricts the distortions in the clipped signal.

According to another feature, the clipping function can attenuate more a central portion of the signal portion including the detected peak than end portions of the signal portion. For example, the clipping function is a parabolic function whose apex value is multiplied by the signal at the detected peak. This feature smoothes the transitions between the non-clipped signal portions and the clipped signal portions.

In another aspect of the invention intended to adapt the clipping threshold of each peak to be clipped as a function of characteristics of the filtering device and/or the power amplifier, the clipping method can further include previously setting up correspondences between peak amplitude intervals and clipping thresholds, and selecting the clipping threshold corresponding to one of the peak amplitude intervals including the amplitude of the detected peak to derive the clipping function further depending on the selected clipping threshold instead of the predetermined clipping threshold.

Still another aspect of the invention is to provide to filtering only the clipped portions in the clipped signal selected as function of the start and end times of said cupped portions, the non-clipped portions in the clipped signal not being filtered. The frequency spectrum of the filtered signal is thus significantly improved.

The invention also concerns a device for clipping a signal with respect to a predetermined clipping threshold, including means for detecting the ends of a signal portion above the clipping threshold and a peak in the signal portion. The device is characterized in that it includes:

means for deriving a clipping function having values less than 1 and depending on the times on the ends of the signal portion, the amplitude of the detected peak and the clipping threshold, and means for clipping the signal portion by multiplying it by the clipping function into a clipped portion.

According to another feature, the device can include means for detecting at least one of the lowest boundary points located on the first ascending and last descending portions of each detected peak. Particularly, the device can include means for enlarging the signal portion to be clipped up to at least one of first and second boundary points of the signal, the first boundary point preceding said first portion and being located below the clipping threshold and on a first ascending portion to the detected peak, the second boundary point following said first portion and being located below the clipping threshold and on a last descending portion from the detected peak, and the clipping function being further derived as a function of the times of said at least one of the first and second boundary points.

According to another aspect, the clipping means in the device of the invention is adapted to supply a clipped signal having non-clipped portions and clipped portions to filtering means. So as to decrease distortion in the clipped signal, the clipping device includes means for supplying a filtering control signal depending on the start and end times of the clipped signal portions to the filtering means. The filtering means is adapted to only filter the clipped portions responsive to the filtering control signal.

Finally the invention relates to a transmitter including the device of the invention, a user terminal including the device of the invention, a base station including the device of the invention, a telecommunication system including at least one of user terminals and base stations including the device of the invention, and a computer program implemented in the device of the invention, the program including program instructions which carry out the steps according to the method of the invention when the program is executed in the clipping device.

Other features and advantages of the present invention will become more clearly apparent on reading the following description of embodiments of the invention given by way of non limiting examples and with reference to the corresponding appended drawings in which.

Figure 1:
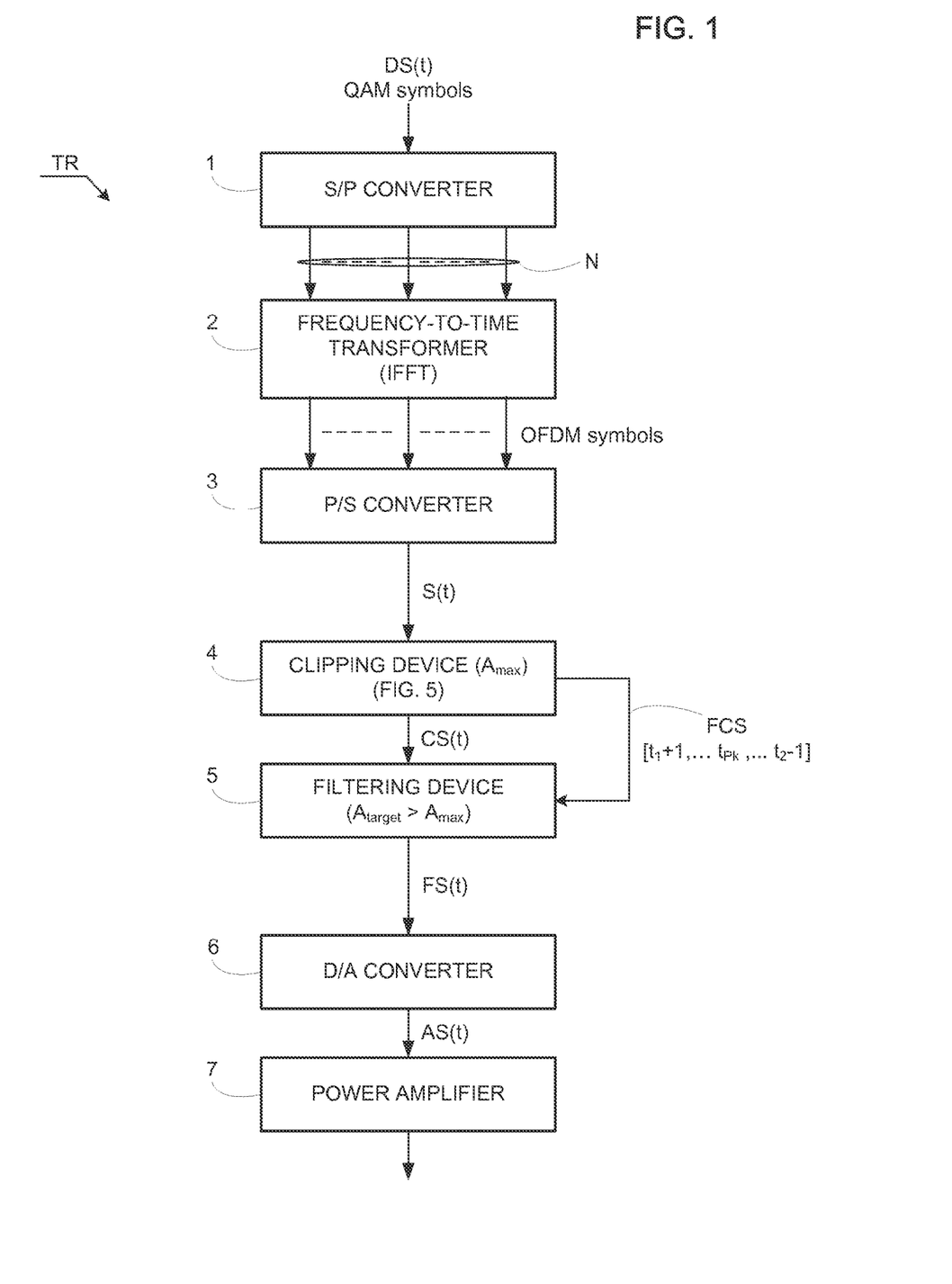
FIG. 1 is a schematic block diagram of a radio communication transmitter including a clipping device according to the invention.

The invention described hereinafter relates to a clipping device of the invention in a part of an OFDM transmitter TR, as shown in FIG. 1. Transmitter TR successively includes a serial-to-parallel converter 1, a frequency-to-time transformer 2, a parallel-to-serial converter 3, the clipping device 4, a band-pass filtering device 5, a digital-to-analog converter 6 and a power amplifier 7, considered as a non-linear device. Power amplifier 7 is included in an intermediary frequency transposition stage connected to an emission stage to emit a radio communication signal by an antenna. For example, the transmitter is included in a user mobile or a base station of a wireless mobile network. The network can be a telecommunication network according to the technology WIMAX (World wide Interoperability Microwave Access) or LTE (Long Term Evolution), or a Professional Mobile Radio (PMR) network of TEDS (TETRA (Terrestrial Trunked Radio) Enhanced Data Service) type, or a DVB (Digital Video Broadcasting) network.

A digital assembly including an encoder, an interleaver and a quadrature amplitude modulation (QAM) modulator provides a baseband QAM modulated data signal DS(t) to serial-to-parallel converter 1. The data signal DS(t) is de serialized by converter 1 into N input QAM symbols corresponding to N orthogonal subcarrier frequencies of an OFDM symbol signal outgoing from frequency-to-time transformer 2. The QAM symbols undergo an inverse fast Fourier transform (IFFT) in transformer 2. For example, the OFDM symbols are distributed on N subcarriers in a frame divided into M time intervals each dedicated to the transmission of N OFDM symbols. Parallel-to-serial converter 3 serializes the OFDM symbols into an incoming data signal S(t) provided to clipping device 4. The incoming data signal S(t) is clipped into a clipped signal CS(t) in clipping device 4. Band-pass filtering device 5 filters the clipped signal into a digital filtered clipped signal FS(t) that is converted by digital-to-analog converter 6 into an analog signal AS(t) to be amplified in power amplifier 7.

Because the incoming OFDM data signal S(t) has a high peak-to-average power ratio PAPR, the signal S(t) has to be clipped before being amplified.

It will be appreciated by a person skilled in the art that any digital incoming signal with any type of modulation to be amplified can be processed by the clipping device and the band-pass filtering device according to the invention. The clipping device and the band-pass filtering device are functional blocks which can correspond to software modules implemented in at least one processor and/or be dedicated or programmable hardware modules within the transmitter.

An incoming data signal S(t) may be expressed in exponential form as:

$$S(t)=A(t)e^{j\phi(t)},$$

where $A(t)$ and $\phi(t)$ are the amplitude and the phase of the signal as a function of time t, and j is the complex number being the square root of "−1". The clipping method of the invention implemented in clipping device 4 relies on the following relationships for a given peak Pk of the signal S(t) exceeding a clipping amplitude threshold equal to the maximum amplitude $A_{max}$ of the clipped signal CS(t):

if $S(t)>A_{max}$ for $t\in[t_s,t_e]$, then $CS(t)=S(t)\times K(t)=A(t)\times K(t)e^{j\phi(t)}$ with $K(t)<1$ for $t\in]t_1,t_2[\subset[t_s,t_e]$ and $t_1<t_s$, $t_2>t_e$; and if $S(t)\leq A_{max}$ for $\forall t\notin]t_1,t_2[$, then $CS(t)=A(t)e^{j\phi(t)}$ with $CS(t_1)=S(t_1)$ and $CS(t_2)=S(t_2)$.

K(t) denotes a clipping function depending upon the amplitude $|S(t_{Pk})|$ of the given peak Pk, i.e. $|S(t_{Pk})|=\max(|S(t)|)$ for $\forall t\in]t_1,t_2[$. The time interval $[t_s,t_e]$ lies between a start time $t_s$ where the signal S(t) begins to exceed the maximum clipping amplitude $A_{max}$ and an end time $t_e$ where the signal S(t) stops to exceed the maximum clipping amplitude $A_{max}$, and delimits a minimum to-be-clipped portion of the incoming data signal S(t) including the given peak Pk. The open bounded time interval $]t_1,t_2[$ enlarges the minimum clipping time interval $[t_s,t_e]$ from one end or both ends of the time interval $[t_s,t_e]$. The open bounded time interval $]t_1,t_2[$ delimits a portion of the signal S(t) to be clipped lying between a low earlier boundary point $[t_1,S(t_1)]$, with $t_1<t_s<t_{Pk}$, located below the maximum amplitude $A_{max}$ and on the first ascending portion to the given peak Pk, and a low later boundary point $[t_2,S(t_2)]$, with $t_{Pk}<t_e<t_2$, located below the maximum amplitude $A_{max}$ and on the last descending portion from the given peak Pk, as shown in terms of power $P=|S(t)|^2$ in FIG. 2. The digital signals S(t) and CS(t) are discrete functions depending on samples from the output of parallel-to-serial converter 3.

The width of the bounded time interval $]t_1,t_2[$ can be fixed and defined by a predetermined number of consecutive samples on the first ascending portion up to the given peak Pk and another predetermined number of consecutive samples on the last descending portion from the given peak Pk. The two predetermined numbers of consecutive samples can be dynamically determined according to a second embodiment described later on.

Figure 2:
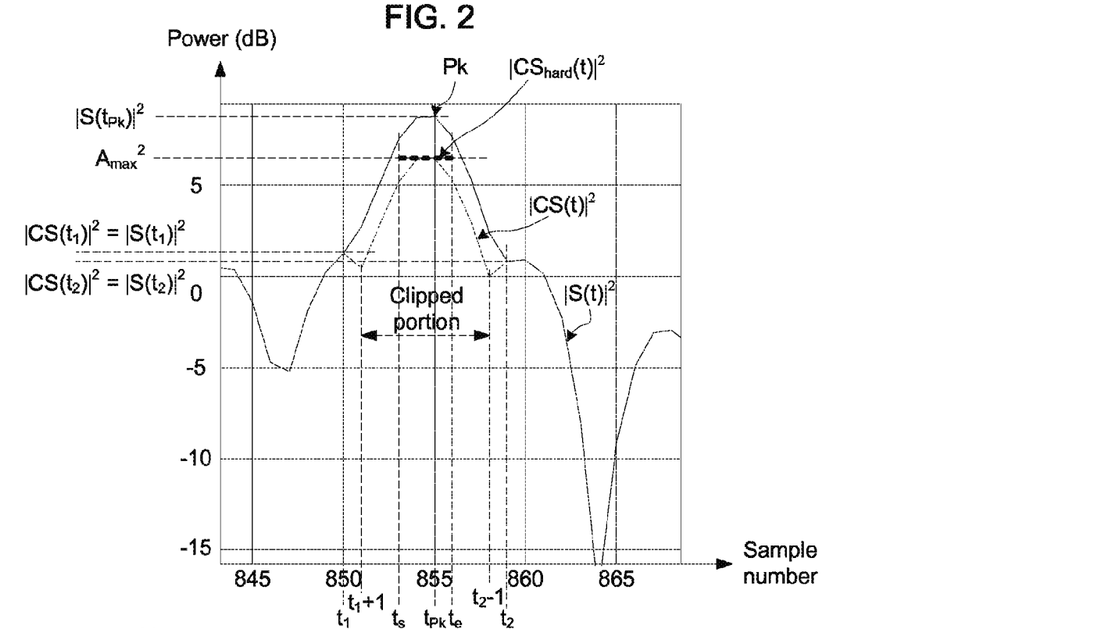
FIG. 2 is a graph showing power variations of an incoming data signal to be clipped and the corresponding signal clipped according to a first embodiment of the invention.

In comparison with a known hard clipping shown by a thick dotted line in FIG. 2, the time interval $[t_s,t_e]$ delimits the portion of the signal S(t) which is replaced by the hard clipped signal $CS_{hard}(t)=A_{max}e^{j\phi(t)}$ having a saturated amplitude and a kept phase if $A(t)>A_{max}$.

A simple example of the clipping function K(t) is a constant CT such as $K(t)=CT=A_{max}/|S(t_{Pk})|<1$ for $t\in]t_1,t_2[$, as shown in FIG. 2.

According to another example, the clipping function K(t) extends on a window $]t_1,t_2[$ symmetrical or asymmetrical about the axis $t=t_{Pk}$ for the given peak Pk, and attenuates more the sample $S(t_{Pk})$ of the given peak Pk and the neighbour samples close to the given peak Pk than the farther samples from the given peak Pk in order to have a smoother discontinuity on the ends of the window $]t_1,t_2[$. In other words, the clipping function attenuates more the central portion ($S(t_s)$, $S(t_e)$) including the detected peak (Pk) of the window $]t_1,t_2[$ than the end portions of the window $]t_1,t_2[$. The distortions between a non-clipped portion and a clipped portion in the clipped signal are thus decreased. The clipping function K(t) can be the following parabolic function: $K(t)=a\times t^2+b\times t+c$ with $t_1\neq t_2$, $K(t_1)=K(t_2)=1$ and $K(t_{Pk})=A_{max}/|S(t_{Pk})|$. The parabolic function has the point $[t_{Pk},K(t_{Pk})]$ as apex. The value $K(t_{Pk})$ of the parabolic function is to be multiplied by the signal at the given peak Pk. The parabolic function can be asymmetrical when the number $NS1=(t_{Pk}-t_1)>0$ of samples to be clipped before the given peak Pk is different from the number $NS2=(t_2-t_{Pk})>0$ of samples to be clipped after the given peak Pk. The coefficients a, b and c of the clipping function K(t) are determined by solving the set of three equations:

$$a\times t_1^2+b\times t_1+c=1,$$

$$a\times t_2^2+b\times t_2+c=1, \text{ and}$$

$$a\times t_{Pk}^2+b\times t_{Pk}+c=A_{max}/|S(t_{Pk})|.$$

These equations can be written in terms of predetermined numbers NS1 and NS2 of samples neighbouring the given peak Pk in the time interval $[t_1,t_2]=[t_{Pk}-NS1,t_{Pk}+NS2]$ with the integers $NS1\geq 0$ and $NS2\geq 0$, and $t_{Pk}=0$; the sample number $t_{Pk}=0$ represents the position of the given peak Pk and the numbers $-NS1$ to 1 and 1 to NS2 represent the positions of the other samples in the interval $[t_1, t_2]$:

$$a \times NS1^2 - b \times NS1 + c = 1,$$

$$a \times NS2^2 + b \times NS2 + c = 1, \text{ and}$$

$$c = A_{max}/|S(t_{Pk})|.$$

Figure 3:
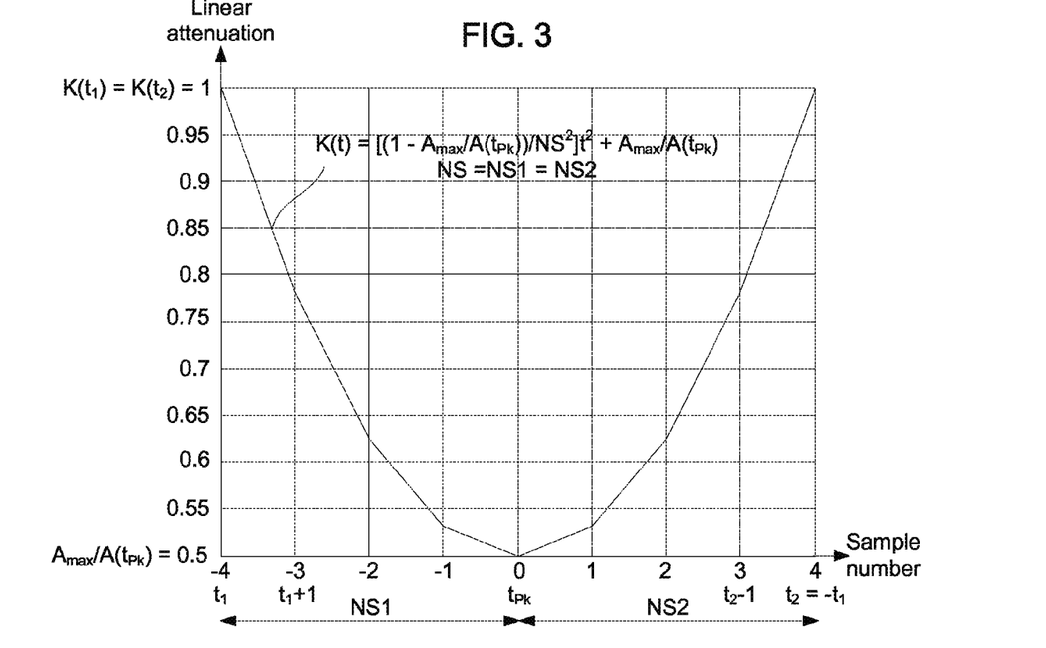
FIG. 3 is a graph showing a parabolic clipping function according to the invention.

For example, the parabolic function K(t) shown in FIG. 3 for NS1=NS2=4 is given by:

$$K(t) = [(1 - A_{max}/|S(t_{Pk})|)/NS^2]t^2 + A_{max}/|S(t_{Pk})|, \text{ with } K(t) < 1 \text{ if } t \notin ]t_1, t_2[.$$

The main benefit of the clipping according to the invention is to improve significantly the transient power in sidebands of the clipped signal CS(t) outside the frequency band of the incoming signal S(t). The clipped signal CS(t) is then filtered into the digital filtered clipped signal FS(t) in band-pass filtering device 5 in dependence on the bandwidth of the incoming signal S(t). The constraints on the bandpass filtering in the device 5 are relaxed and less critical than that used in the state of the art, because the transient power in sidebands of the clipped signal CS(t) is significantly decreased.

Furthermore, it is known that the filtering of a clipped signal in a filtering device increases the amplitudes of the peaks in the filtered clipped signal with respect to the amplitudes of the corresponding peaks in the clipped signal. The ratio PAPR of the filtered clipped signal is always more than the ratio PAPR of the dipped signal. The filtering threshold $A_{target}$ has to be less than the saturation threshold of the power amplifier 7 behind the band-pass filtering device 5. In consequence according to the invention, the maximum amplitude $A_{max}$ defining the clipping threshold is very close to the filtering threshold $A_{target}$. For a desired peak-to-average power ratio PARR after filtering, the difference $A_{target} - A_{max}$ according to the invention is a fraction of decibel in terms of power and is significantly less than the difference $A_{target} - A_{max}$ of a few decibels in terms of power according to the state of the art. For instance, for a desired filtering threshold $A_{target}^2$ of the digital filtered clipped signal FS(t) equal to 7 dB, a known clipping and filtering method, including a hard clipping, needs to apply a clipping power threshold less than 5 dB and the invention needs to apply a clipping power threshold $A_{max}^2$ more than 6 dB.

In a variant, the band-pass filtering device 5 stores a table that is associated with a predetermined filtering threshold $A_{target}$ and that maps predetermined intervals of to-be-clipped peak amplitudes and clipping thresholds $A_{max}$. The amplitude $|S(t_{Pk})|$ of a given peak Pk is measured and compared with the predetermined amplitude intervals in clipping device 4 so as to select one of the predetermined amplitude intervals including the amplitude $|S(t_{Pk})|$ of a given peak Pk. The given peak Pk is then clipped with regard to the clipping threshold $A_{max}$ corresponding to the selected amplitude interval. This variant enables to adapt the clipping threshold of each peak to be clipped as a function of the characteristics of the transfer function of filtering device 5.

Thus in the clipping device 4, the clipping function K(t) for each sample of a peak to be clipped in the incoming data signal S(t) depends on the limits $t_1$ and $t_2$ of the bounded time interval $]t_1, t_2[$ associated with the peak, the amplitude $|S(t_{Pk})|$ of the peak, and the maximum clipping amplitude $A_{max}$ that can depend on a predetermined filtering threshold $A_{target}$.

Figure 5:
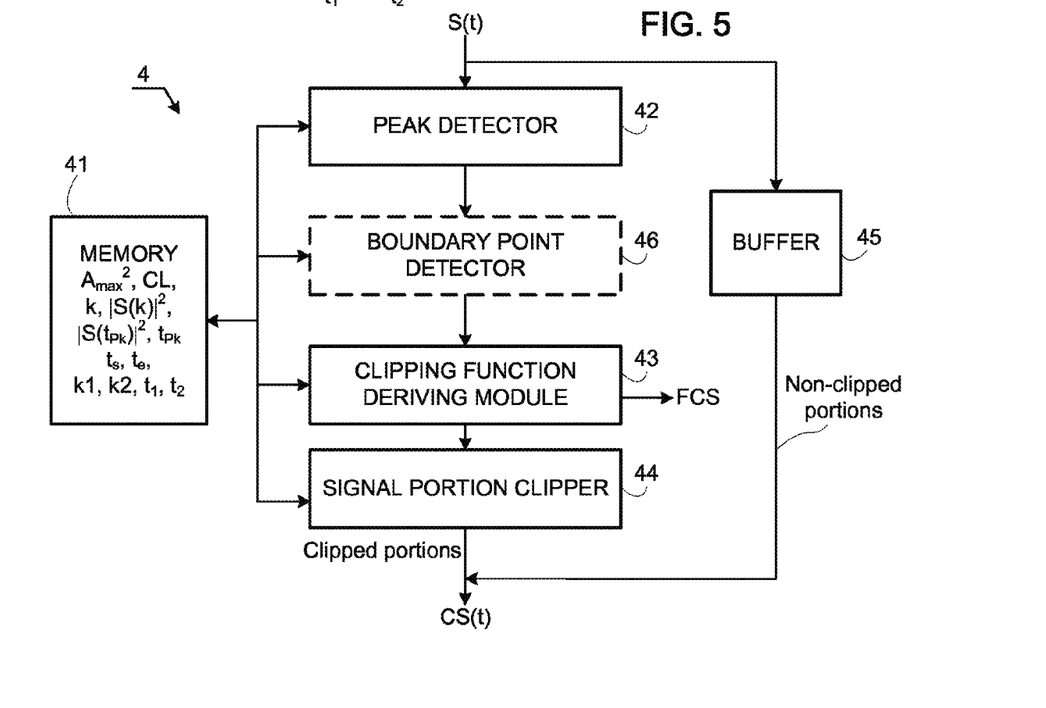
FIG. 5 is a schematic block diagram of the clipping device according to the invention.

FIG. 5 shows functional means included in the clipping device 4 for implementing the clipping method of the invention. Device 4 includes a memory 41 to store parameters required by the clipping function K(t) associated with a peak, a peak detector 42, a clipping function deriving module 43, a signal portion clipper 44 and a buffer 45. Buffer 45 temporarily stores the samples of the digital incoming signal S(t) for a predetermined maximum temporisation indispensable for deriving the clipping function K(t) associated with a peak having the longest width and for determining a clipped signal portion. The buffer only retransmits the non-clipped portions of the incoming signal S(t) which are mixed with the clipped portions from dipper 44 to constitute the outgoing dipped signal CS(t).

Figure 6:
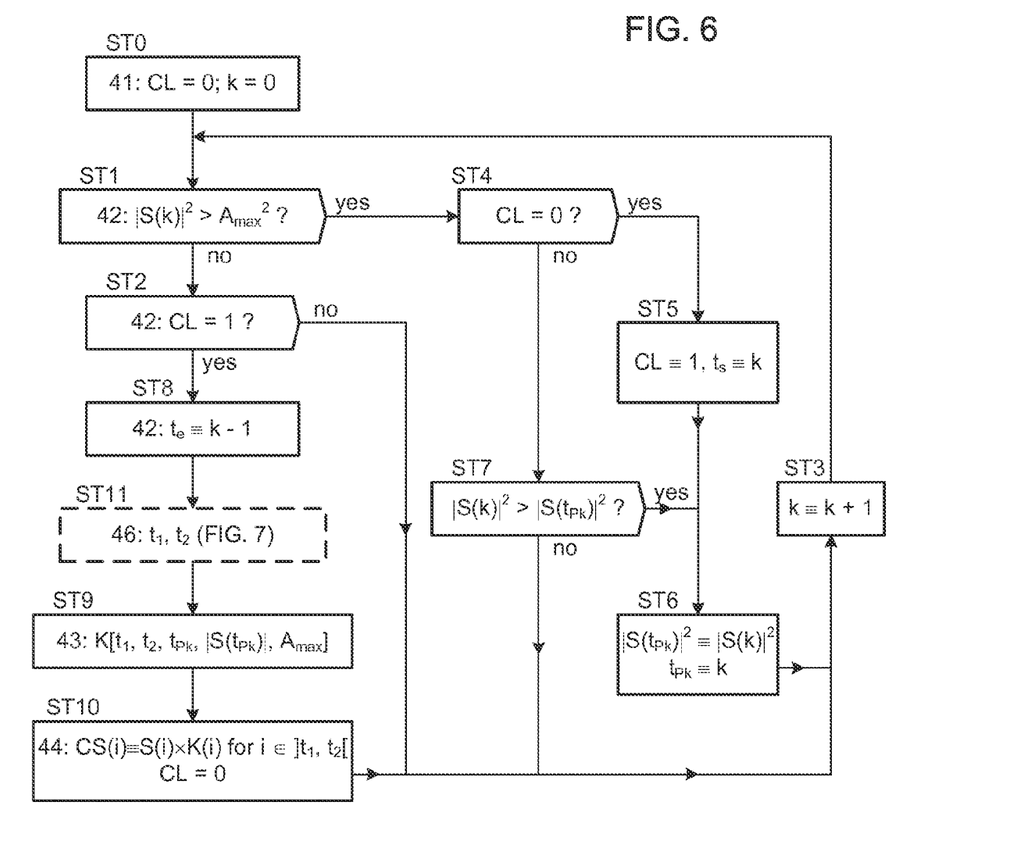
FIG. 6 is a flow chart of the clipping method according to the first embodiment of the invention.

As shown in FIG. 6, the dipping method of the invention includes steps ST0 to ST10 automatically executed in the dipping device 4, for example under the control of a computer program implemented in a processor included in the dipping device.

Initially, in step ST0, the dipping method starts by processing a first sample S(0) of the signal S(k) to be clipped. The sample number k and a logic clipping indicator CL are set to "0" in memory 41 having stored a predetermined clipping power threshold $A_{max}^2$.

Peak detector 42 begins dynamically to search for a peak in the signal S(k) in step ST1 by measuring the power $|S(k)|^2$ of each signal sample S(k) and comparing it to the clipping power threshold $A_{max}^2$. For a power $|S(k)|^2$ of the sample equal to or less than $A_{max}^2$, detector 42 increments the sample number by one unity (k=k+1) in step ST3 provided that the clipping indicator CL is kept to "0" in step ST2.

If the power $|S(k)|^2$ of the sample is more than $A_{max}^2$ in step ST1, then detector 42 verifies whether a clipping is running in step ST4. When the portion of the signal preceding the signal sample S(k) having a power $|S(k)|^2$ more than $A_{max}^2$ does not contain a peak, the clipping indicator CL is equal to zero. Detector 42 sets the indicator CL to "1" and a peak start parameter $t_s$ to the number k of the sample in step ST5 and a peak power parameter $|S(t_{Pk})|^2$ to the power $|S(k)|^2$ and a peak sample number $t_{Pk}$ to k in step ST6, and then increments the sample number by one unity in step ST3, The previous parameters are stored in memory 41.

Peak detector 42 searches for one peak sample having the maximum power in the following signal samples whose powers are more than $A_{max}^2$, by executing the iterative steps ST1, ST4, ST7 and ST6. For each of these following signal samples, detector 42 compares the power $|S(k)|^2$ of the sample to the peak power parameter $|S(t_{Pk})|^2$ in step ST7 succeeding to steps ST1 and ST4. If the power $|S(k)|^2$ of the tested sample is greater than the powers of the preceding tested samples in step ST7, i.e. $|S(k)|^2 > |S(t_{Pk})|^2$, detector 42 sets the peak power parameter $|S(t_{Pk})|^2$ equal to the power $|S(k)|^2$ of the tested sample and the peak sample number $t_{Pk}$ to k in step ST6. The parameters $|S(t_{Pk})|^2$ and $t_{Pk}$ are stored in memory 41. Otherwise, the parameter $|S(t_{Pk})|^2$ is kept in step ST7. After step ST6, or after step ST7 with a response "no", detector 42 continues the analysis of the power of the following samples by returning to step ST3 and executing the steps ST1, ST4, ST7 and ST6 up to detect a sample having a power $|S(k)|^2$ equal to or less than the predetermined clipping power threshold $A_{max}^2$.

If $|S(k)|^2 \leq A_{max}^2$ in step ST1 and as CL="1" in step ST2, memory 41 stores a peak end parameter $t_e$ equal to the number k−1 of the last tested sample having a power $|S(k)|^2 > A_{max}^2$ to mark the end of the detected peak Pk with the amplitude $|S(t_{Pk})|$, in step ST8. In step ST9, clipping function deriving module 43 solves the set of equations and derives the respective clipping function $K[t_1, t_2, t_{Pk}, |S(t_{Pk})|, A_{max}]$ for the detected peak on the basis of the following parameters:

the start time $t_1 = t_s - NS_1 = t_{Pk} - NS1$ and the end time $t_2 = t_e + NS_2 = t_{Pk} + NS2$ expressed in sample number, with $NS_1 \geq 0$ and NS$_2$≥0, limiting the portion of the incoming signal containing the detected peak to be clipped, i.e. defining the bounded time interval ]t$_1$, t$_2$[; the sample numbers NS$_1$ and NS$_2$, or NS1 and NS2, can be pre-stored in memory 41, or can be calculated as a function of the parameters t$_s$ and t$_e$; according to the example illustrated in FIG. 3, NS1=NS2=NS;

the amplitude |S(t$_{Pk}$)| of the detected peak; and the clipping power threshold A$_{max}$.

Then in step ST10, signal portion clipper 44 determines the clipped samples CS(i) included in the bounded time interval ]t$_1$, t$_2$[ as a function of the parameters of the clipping function supplied by module 43:

$$CS(i)=S(i)\times K(i)e^{j\cdot\phi(i)} \text{ for } i\in ]t_1, t_2[.$$

The clipped samples CS(t$_1$+1) to CS(t$_2$-1) are provided by clipper 44 after the predetermined maximum temporisation and respectively replace the corresponding samples S(t$_1$+1) to S(t$_2$-1) of the incoming signal to constitute a clipped signal portion introduced after a portion of the incoming signal a priori non-clipped and read from buffer 45. The clipping indicator CL is reset to "0" in memory 41 in step ST10, the sample number is incremented in step ST3, and detector 42 again searches for one peak having the maximum power in the incoming signal samples following the sample S(t$_e$+1) from step ST1.

Figure 4:
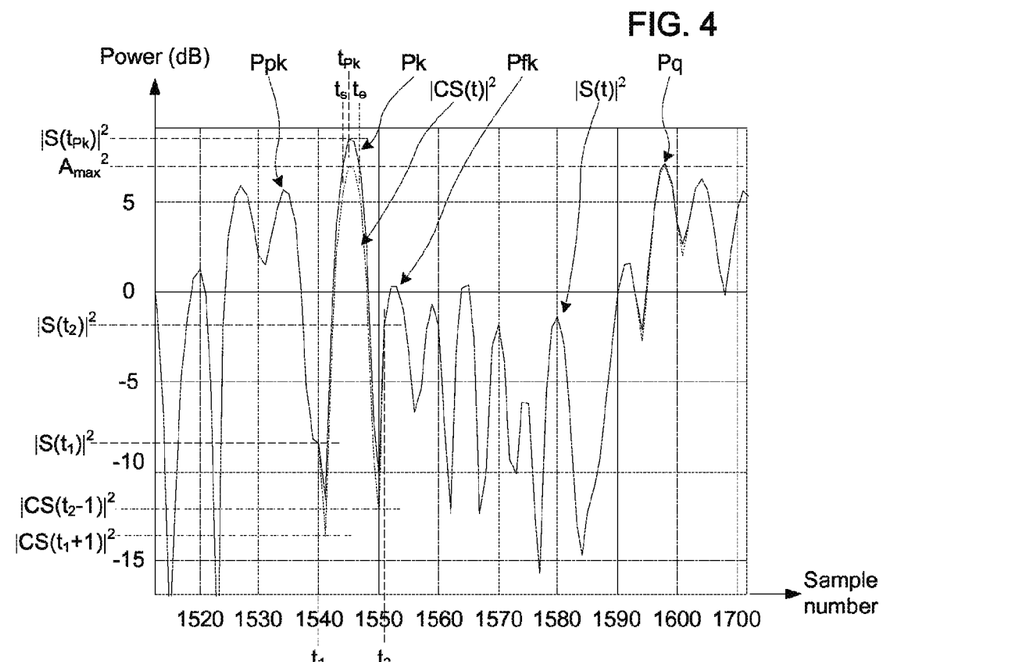
FIG. 4 is graph showing the power variations of an incoming data signal to be clipped and the corresponding signal clipped according to a second embodiment of the invention.

According to an improved embodiment of the invention illustrated in FIG. 4, the transitions where the slope of the signal S(t) to be clipped change sign and the signal S(t) has "gorges" between the peak Ppk preceding the given peak Pk to be clipped and the given peak Pk and between the given peak Pk and the peak Pfk following the given peak Pk, are used to define the bounded time interval ]t$_1$, t$_2$[ with

|S(t$_1$+1)|=min(|S(t)|)≤A$_{max}$ for all the points [t, S(t)] on the first ascending portion to the given peak Pk, and

|S(t$_2$-1)|=min(|S(t)|)≤A$_{max}$ for all the points [t, S(t)] on the last descending portion from the given peak Pk.

In FIG. 4, another peak Pq of the signal S(t) is also clipped.

This second embodiment improves the smoothing between succeeding peaks in the clipped signal CS(t), particularly on the ends of each peak to be clipped, and also the limitation of the distortions. The portion of the given peak Pk to be clipped is enlarged to all the samples of the given peak in order to start the clipping from the gorge preceding the given peak, i.e. from the lowest earlier boundary point [t$_1$, S(t$_1$)] on the first ascending portion to the given peak, and to end the clipping in the gorge following the given peak. i.e. up to the lowest later boundary point [t$_2$, S(t$_2$)] on the last descending portion from the given peak. The widths of the bounded time intervals respectively associated to the peaks to be clipped are dynamically determined as a function of the respective characteristics of the peaks and are a priori different.

Advantageously, the transient power in sidebands of the clipped signal CS(t) outside the frequency band of the incoming signal S(t) is still decreased. The difference A$_{target}$-A$_{max}$ between the filtering threshold A$_{target}$ and the clipping threshold A$_{max}$ can be still decreased. The second embodiment limits as much as possible the distortions for the lower peaks of the clipped signal.

In the second embodiment, the clipping device 4 includes a boundary point detector 46 interconnected to detector 42 and module 43 as shown in FIG. 5, and the clipping method includes a step ST11 between the steps ST8 and ST9, as shown in FIG. 6, for dynamically detecting the lowest boundary points [t$_1$+1, S(t$_1$+1)] and [t$_2$-1, S(t$_2$-1)] of the detected peak having the amplitude |S(t$_{Pk}$)|$^2$. The lowest boundary points delimit the start of the ascending portion of the detected peak before the sample t$_s$ marked in step ST5 and the end of the descending portion of the detected peak after the sample t$_e$ marked in step ST8, as illustrated in FIG. 4 for the detected peak Pk. Detector 46 is capable of counting down samples before the detected peak and counting up samples after the detected peak.

Figure 7:
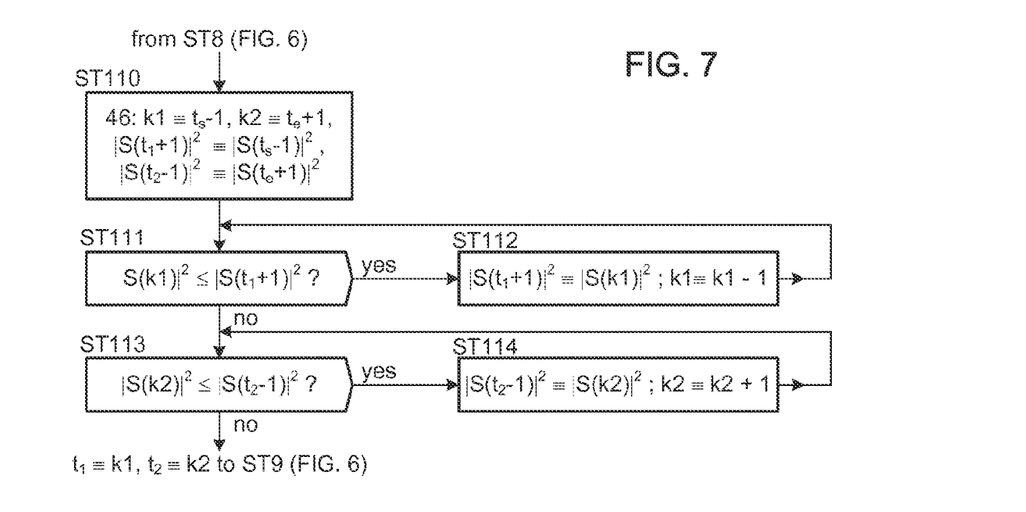
FIG. 7 is a flow chart of a method used in the clipping method according to the second embodiment to determine the lowest boundary points of a peak of the incoming data signal to be clipped.

Step ST11 includes steps ST110 to ST114 shown in FIG. 7. In the initial step ST110, detector 46 sets parameters k1 to t$_s$-1, k2 to t$_e$+1, |S(t$_1$+1)|$^2$ to |S(t$_s$-1)|$^2$ and |S(t$_2$-1)|$^2$ to |S(t$_e$+1)|$^2$ intended to progressively define the width of the detected peak from the limits of the intervals [t$_s$, t$_e$] and [|S(t$_s$)|$^2$, |S(t$_e$)|$^2$] supplied by detector 42. The order of the pairs of steps ST111-ST112 and ST113-ST114 is of no importance.

In steps ST111 and ST112, detector 46 searches for the lowest earlier boundary point on the ascending portion of the detected peak Pk below the predetermined clipping power threshold A$_{max}$. Detector 46 measures the power |S(k1)|$^2$ of each current sample of the incoming signal counted down from the sample S(t$_s$) and compares it to the power |S(t$_1$+1)|$^2$ of the following sample in step ST111. If |S(k1)|$^2$≤|S(t$_1$+1)|$^2$, detector 46 sets the parameter |S(t$_1$+1)|$^2$ to the value of the current sample |S(k1)|$^2$ and decrements the sample number k1 by one unity in step ST112. As soon as the power of the current sample is more than the power of the sample following the current sample in step ST111, the sample following the current sample [t$_1$, S(t$_1$+1)] is designated by detector 46 as the lowest earlier boundary point [t$_1$+1, S(t$_1$+1)] of the detected peak to be clipped. The parameter t$_1$ is written in memory 41.

In steps ST113 and ST114 similar to steps ST111 and ST112, detector 46 searches for the lowest later boundary point on the descending portion of the detected peak Pk below the predetermined clipping power threshold A$_{max}$. Detector 46 measures the power |S(k2)|$^2$ of each current sample of the incoming signal counted up from the sample S(t$_e$) and compares it to the power |S(t$_2$-1)|$^2$ of the preceding sample in step ST113. If |S(k2)|$^2$≤|S(t$_2$-1)|$^2$, detector 46 sets the parameter S(t$_2$-1)$^2$ to the value of the current sample |S(k2)|$^2$ and increments the sample number k2 by one unity in step ST114. As soon as the power of the current sample is more than the power of the sample preceding the current sample in step ST113, the sample preceding the current sample [t$_2$, S(t$_2$)] is designated by detector 46 as the lowest later boundary point [t$_2$-1, S(t$_2$-1)] of the detected peak to be clipped. The parameter is written in memory 41.

After step ST11, module 43 reads particularly the limit parameters t$_1$ and t$_2$ to derive the clipping function K[t$_1$, t$_2$, t$_{Pk}$, |S(t$_{Pk}$)|, A$_{max}$] by solving the set of equations in step ST9.

In a variant of the invention, the memory 41 in clipping device 4 stores a mapping table previously set up in association with a predetermined filtering threshold A$_{target}$ in the filtering device 5. The mapping table maps predetermined peak amplitude intervals and clipping thresholds. The amplitude S(t$_{Pk}$) of a detected given peak Pk measured by the detector 42 is compared with the predetermined peak amplitude intervals by module 43 in step ST9 so as to select the clipping threshold, denoted CTh in this variant, corresponding to one of the predetermined peak amplitude intervals including the amplitude |S(t$_{Pk}$)| of the detected peak Pk. The selected clipping threshold CTh is used instead of the maximum amplitude A$_{max}$ to derive the clipping function K[t$_1$, t$_2$, t$_{Pk}$, |S(t$_{Pk}$)|, CTh] in step ST10, and the detected peak Pk is thus dipped with regard to the selected dipping threshold CTh. This variant enables to adapt the dipping threshold of each peak to be dipped as a function of characteristics of the filtering device 5 and thus to match the dipping of the signal to the wished power at the input of the power amplifier 7.

In another variant of the invention, the dipped portions of the signal CS(t) respectively extending in the bounded time intervals $]t_1, t_2[$ of the clipped peaks are only filtered in filtering device 5 and the non-clipped portions of the signal CS(t) such as CS(t)=S(t) are not filtered. The clipped portions and the non-clipped portions of the signal CS(t) are selected in filtering device 5 by a logic filtering control signal FCS provided by module 43 in clipping device 4, as shown in FIGS. 1 and 5. The signal FCS has a first state during the interval $]t_1, t_2[$ of the clipped portions and a second state during the non-clipped portions of the signal CS(t). Each clipped portion is thus selected as function of the corresponding boundary points $[t_1+1, S(t_1+1)]$ and $[t_2-1, S(t_2-1)]$ derived in step ST9. These conditions limit the workload of the filtering device 5 and improve significantly the frequency spectrum of the filtered signal FS(t) to be amplified by limiting any distortion to the sparse clipped portions in the filtered signal.

The invention described here relates to a method and a device for clipping a signal. In one implementation, the steps of the method of the invention are determined by the instructions of a computer program incorporated in the device. The program includes program instructions which carry out the steps of the method according to the invention when said program is executed in the device, whose operation is then controlled by the execution of the program.

Consequently, the invention also applies to a computer program, in particular a computer program stored on or in a storage medium readable by a computer and by any data processing device adapted to implement the invention. This program can use any programming language and take the form of source code, object code, or an intermediate code between source code and object code, such as a partially compiled form, or any other form desirable for implementing the method according to the invention.

The storage medium can be any entity or device capable of storing the program. For example, the medium can include storage means in which the computer program according to the invention is stored, such as a ROM, for example a CD ROM or a microelectronic circuit ROM, a USB key, or magnetic storage means, for example a hard disk.

The invention claimed is:

1. A method for clipping a signal (S(t)) with respect to a predetermined clipping threshold ($A_{max}$) using a computing device (4), including:
    detecting (ST1-ST7) the ends of a signal portion (S(t$_s$), S(t$_e$)) above the clipping threshold and a peak (Pk) in the signal portion,
    deriving (ST9), using the computing device, a clipping function (K(t)) having values less than 1 and depending on the times (t$_s$, t$_e$) on the ends of the signal portion, the amplitude of the detected peak and the clipping threshold,
    enlarging (ST9) the signal portion (S(t$_s$), S(t$_e$)) to be clipped up to at least one of first and second boundary points of the signal, the first boundary point $[t_1+1, S(t_1+1)]$ preceding said signal portion and being located below the clipping threshold ($A_{max}$) and on a first ascending portion to the detected peak (Pk), the second boundary point $[t_2-1, S(t_2-1)]$ following said first signal portion and being located below the clipping threshold ($A_{max}$) and on a last descending portion from the detected peak (Pk), and the clipping function (K(t)) being further derived as a function of the time ($t_1+1$, $t_2-1$) of said at least one of the first and second boundary points, and
    clipping (ST10) the signal portion (S(t$_s$), S(t$_e$)) by multiplying it by the clipping function into a clipped portion (CS(t$_s$), CS(t$_e$)), using the computing device,
    characterized in that it further includes detecting (ST11) at least one of the lowest boundary point $[t_1+1, S(t_1+1)]$, as said first boundary point, located on the first ascending portion to the detected peak (Pk) and the lowest earlier boundary point $[t_2-1, S(t_2-1)]$, as said second boundary point, located on the last descending portion from the detected peak (Pk).

2. A method according to claim 1, wherein the clipping function (K(t)) attenuates more a central portion of the signal portion (S(t$_s$), S(t$_e$); S(t$_1$+1), S(t$_2$-1)) including the detected peak (Pk) than end portions of the signal portion.

3. A method according to claim 2, wherein the clipping function (K(t)) is a parabolic function whose apex value is multiplied by the signal at the detected peak (Pk).

4. A method according to claim 1, further including previously setting up correspondences between peak amplitude intervals and clipping thresholds, and selecting (ST9) the clipping threshold corresponding to one of the peak amplitude intervals including the amplitude of the detected peak (Pk) to derive the clipping function further depending on the selected clipping threshold instead of the predetermined clipping threshold ($A_{max}$).

5. A method according to claim 1 for clipping said signal (S(t)) into a clipped signal (CS(t)) having non-clipped portions and clipped portions (CS(t$_s$), CS(t$_e$); CS(t$_1$+1), CS(t$_2$-1)), said method including filtering only said clipped portions selected as function of the start and end times of said clipped portions.

6. A computer program adapted to be implemented in the computing device for clipping a signal (S(t)) with respect to a predetermined clipping threshold ($A_{max}$), said program being characterized in that it includes program instructions which carry out the steps of the method according to claim 1 when said program is executed in the computing device.

7. A device for clipping a signal (S(t)) with respect to a predetermined clipping threshold ($A_{max}$), including
    means (42) for detecting (ST1-ST7) the ends of a signal portion (S(t$_s$), S(t$_e$)) above the clipping threshold and a peak (Pk) in the signal portion,
    means (43) for deriving a clipping function (K(t)) having values less than 1 and depending on the times (t$_s$, t$_e$) on the ends of the signal portion, the amplitude of the detected peak and the clipping threshold,
    means (43) for enlarging the signal portion (S(t$_s$), S(t$_e$)) to be clipped up to at least one of first and second boundary points of the signal, the first boundary point $[t_1+1, S(t_1+1)]$ preceding said first portion and being located below the clipping threshold ($A_{max}$) and on a first ascending portion to the detected peak (Pk), the second boundary point $[t_2-1, S(t_2-1)]$ following said first portion and being located below the clipping threshold ($A_{max}$) and on a last descending portion from the detected peak (Pk), and the clipping function (K(t)) being further derived as a function of the times ($t_1+1$, $t_2-1$) of said at least one of the first and second boundary points, and
    means (44) for clipping the signal portion (S(t$_s$), S(t$_e$)) by multiplying it by the clipping function into a clipped portion (CS(t$_s$), CS(t$_e$)),
    characterized in that the device further includes:
    means (46) for detecting (ST11) at least one of the lowest boundary point $[t_1+1, S(t_1+1)]$, as said first boundary point, located on the first ascending portion to the detected peak (Pk) and the lowest earlier boundary point $[t_2-1, S(t_2-1)]$, as said second boundary point, located on the last descending portion from the detected peak (Pk).

8. A device according to claim 7, including means (43) for supplying a filtering control signal (FCS) depending on the start and end times of clipped portions ($CS(t_1+1)$, $CS(t_2-1)$), and filtering means (5) for only filtering said clipped portions responsive to the filtering control signal (FCS).

9. A transmitter including the device according to claim 7.

10. A user terminal including the device according to claim 7.

11. A base station including the device according to claim 7.

12. A telecommunication system including at least one of user terminals and base stations including the device according to claim 7.

* * * * *

UNITED STATES PATENT AND TRADEMARK OFFICE
CERTIFICATE OF CORRECTION

| | | |
|---|---|---|
| PATENT NO. | : 9,031,157 B2 | Page 1 of 1 |
| APPLICATION NO. | : 13/820940 | |
| DATED | : May 12, 2015 | |
| INVENTOR(S) | : Christophe Molko and Matti Limingoja | |

It is certified that error appears in the above-identified patent and that said Letters Patent is hereby corrected as shown below:

On the title page item "(76)" should read --(75)--.

On the title page item (73), add the Assignee AIRBUS DS SAS.

Signed and Sealed this
Twenty-second Day of March, 2016

Michelle K. Lee
*Director of the United States Patent and Trademark Office*